US011246088B2

(12) United States Patent
Srivastava et al.

(10) Patent No.: US 11,246,088 B2
(45) Date of Patent: Feb. 8, 2022

(54) FAILOVER AND MANAGEMENT OF MULTI-VENDOR NETWORK SLICES

(71) Applicant: Cisco Technology, Inc., San Jose, CA (US)

(72) Inventors: Vimal Srivastava, Bangalore (IN); Sri Gundavelli, San Jose, CA (US); Aeneas Sean Dodd-Noble, Andover, MA (US); Irfan Ali, Palo Alto, CA (US); Ravi Kiran Guntupalli, Cumming, GA (US); Ian McDowell Campbell, Littleton, CO (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/845,877

(22) Filed: Apr. 10, 2020

(65) Prior Publication Data

US 2021/0321325 A1 Oct. 14, 2021

(51) Int. Cl.
| | |
|---|---|
| *H04W 48/18* | (2009.01) |
| *H04W 36/00* | (2009.01) |
| *H04W 48/16* | (2009.01) |
| *H04W 80/02* | (2009.01) |
| *H04L 29/08* | (2006.01) |
| *H04L 12/24* | (2006.01) |
| *H04L 29/12* | (2006.01) |
| *H04W 36/16* | (2009.01) |
| *H04W 76/19* | (2018.01) |

(52) U.S. Cl.
CPC ......... *H04W 48/18* (2013.01); *H04L 41/0893* (2013.01); *H04L 61/2061* (2013.01); *H04L 69/322* (2013.01); *H04W 36/0022* (2013.01); *H04W 36/165* (2013.01); *H04W 48/16* (2013.01); *H04W 76/19* (2018.02); *H04W 80/02* (2013.01)

(58) Field of Classification Search
None
See application file for complete search history.

(56) References Cited

U.S. PATENT DOCUMENTS

| 10,070,344 | B1 * | 9/2018 | Dowlatkhah | ......... H04W 28/16 |
| 10,291,554 | B1 * | 5/2019 | Ghosh | ..................... H04L 41/12 |
| 11,115,920 | B1 * | 9/2021 | Seetharaman | ........ H04W 24/08 |
| 2017/0141973 | A1 * | 5/2017 | Vrzic | .................. H04L 41/5051 |

(Continued)

FOREIGN PATENT DOCUMENTS

| WO | 2019/029636 | 8/2018 |
| WO | 2018/171430 | 9/2018 |

*Primary Examiner* — Ajit Patel
(74) *Attorney, Agent, or Firm* — Polsinelli PC

(57) ABSTRACT

A network slice controller obtains health information of an active network slice provided by a first vendor and health information of a set of backup network slices provided by a second vendor. The network slice controller evaluates, using a set of policies corresponding to management of the active network slice, the health information of the active network slice to determine whether the active network slice has failed. As a result of the failure of the active network slice, the network slice controller identifies one or more backup network slices of the set of backup network slices to serve as new active network slices. The network slice controller activates these one or more backup network slices to serve as the new active network slices for the network.

20 Claims, 8 Drawing Sheets

(56) References Cited

U.S. PATENT DOCUMENTS

| | | |
|---|---|---|
| 2018/0278466 A1* | 9/2018 | McCormick ........ H04L 41/0654 |
| 2018/0316615 A1 | 11/2018 | Shaw et al. |
| 2019/0037409 A1* | 1/2019 | Wang .................... H04W 16/04 |
| 2019/0149998 A1* | 5/2019 | Yang .................... H04W 16/04 |
| | | 370/328 |
| 2019/0174347 A1 | 6/2019 | Dowlatkhah et al. |
| 2019/0223055 A1* | 7/2019 | Bor Yaliniz .......... H04W 28/26 |
| 2019/0312782 A1* | 10/2019 | Vaishnavi ............ H04L 41/0893 |
| 2020/0044943 A1* | 2/2020 | Bor-Yaliniz ........ H04L 41/5025 |
| 2020/0170052 A1* | 5/2020 | Yang .................... H04W 28/26 |
| 2020/0267557 A1* | 8/2020 | Zhao .................... H04L 41/0896 |
| 2021/0084582 A1* | 3/2021 | Li ........................ H04W 24/08 |
| 2021/0160897 A1* | 5/2021 | Young ................ H04L 41/5012 |

\* cited by examiner

US 11,246,088 B2

FAILOVER AND MANAGEMENT OF MULTI-VENDOR NETWORK SLICES

TECHNICAL FIELD

The present disclosure generally relates to the field of computer networking, particularly with regard to the maintenance and failover support across multi-vendor network slices.

BACKGROUND

As wireless networks and technologies continue to evolve, operators of these wireless networks are deploying network slices to support various vertical industries with unique sets of service requirements. Operators of these wireless networks often deploy network slices from multiple vendors. These network slices can include all necessary functions: a session management function (SMF), a user plane function (UPF), a policy control function (PCF), a network repository function (NRF), and the like. In such a multi-vendor network slice deployment, the requirements are typically centered on providing failover support across the network slices provided by the different vendors.

The $3^{rd}$ Generation Partnership Project (3GPP) has provided extensive support for node restoration procedures. For instance, the methods defined by the 3GPP are centered on node-level failures (e.g., UPF, SMF, or Access and Mobility Management Function (AMF)), with procedures for recovery after a node failure. However, no restoration procedures have been defined for restoring a network slice in the event of a network slice failure. Further, no rules have been defined that can be used to determine a network slice failure. Similarly, in the event of a network slice failure, no procedures have been defined for migrating network sessions to a different vendor network slice. Thus, in the event of a network slice failure, it is difficult for operators of these wireless networks to address the network slice failure efficiently and in a manner that results in restoration of network functionality.

BRIEF DESCRIPTION OF THE FIGURES

To provide a more complete understanding of the present disclosure and features and advantages thereof, reference is made to the following description, taken in conjunction with the accompanying drawings, in which.

DETAILED DESCRIPTION

Figure 1:
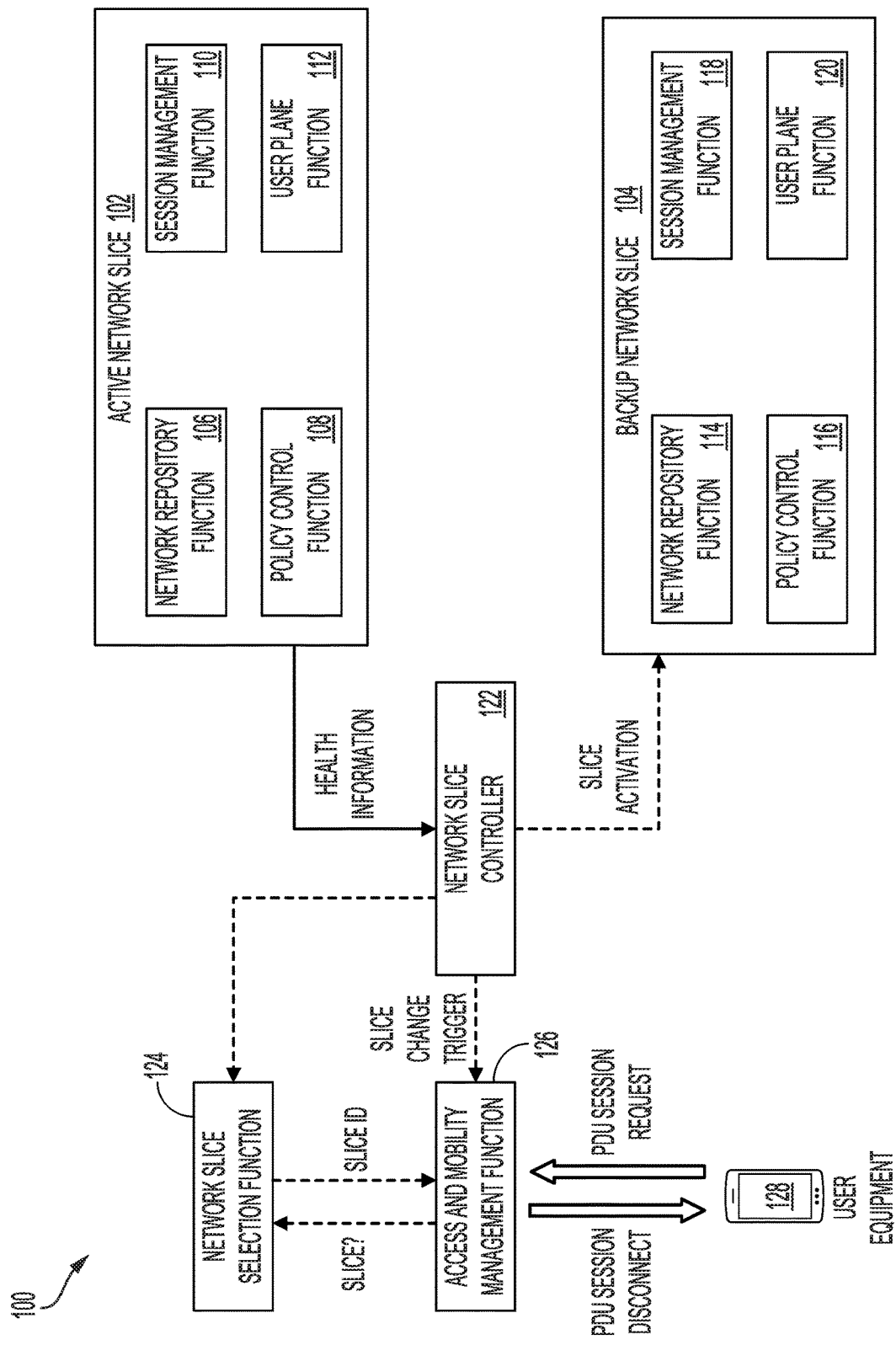
FIG. 1 shows an illustrative example of an environment in which a network slice controller activates a backup network slice as a result of a determination of a failure of an active network slice in accordance with various implementations.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Disclosed herein are systems, methods and computer-readable storage media for activating one or more backup network slices in the event of a failure of an active network slice.

In an example, a computer-implemented method performed by a network slice controller comprises obtaining first health information of an active network slice provided by a first vendor and second health information of a set of backup network slices provided by a second vendor. The first health information and the second health information correspond to events encountered by the active network slice and the set of backup network slices, respectively. The computer-implemented method further comprises evaluating, using a set of policies corresponding to management of the active network slice, the first health information to identify an event corresponding to a failure of the active network slice. The set of policies include a first subset of policies applicable to the active network slice and obtained from the first vendor and a second subset of policies applicable to the backup network slices and obtained from the second vendor. The computer-implemented method further comprises, as a result of the failure of the active network slice, identifying one or more backup network slices of the set of backup network slices to serve as new active network slices; and activating the one or more backup network slices to serve as the new active network slices.

In one example, the computer-implemented method further includes determining, based on first configuration data of the active network slice, a configuration of the active network slice. Further, the computer-implemented method includes evaluating second configuration data of the set of backup network slices to identify the one or more backup network slices. These one or more backup network slices collectively have the configuration of the active network slice.

In an example, activating the one or more backup network slices includes distributing an Internet Protocol (IP) address pool of the active network slice to the one or more backup network slices. This allows for the migration of resources from a failed network slice to any number of backup network slices in order to support user equipment sessions with the network slices.

In an example, the computer-implemented method further includes triggering a Packet Data Unit (PDU) session disconnection of a user equipment. Further, the computer-implemented method includes obtaining, from the user equipment, a request to establish a new PDU session. In response to this request, the computer-implemented method includes querying a Network Slice Selection Function (NSSF) to identify a network slice instance identifier of a new active network slice to which the new PDU session can be established. The NSSF may be updated prior to the query to indicate that the new active network slice is available. The new PDU session is then established using the new active network slice.

In an example, establishing the new PDU session within the new active network slice includes migrating a PDU session of the active network slice to the new active network slice. In some examples, the computer-implemented method further includes transmitting, to the user equipment, a notification to indicate that the new PDU session can be established.

In an example, a system comprises one or more processors and memory including instructions that, as a result of being executed by the one or more processors, cause the system to perform the processes described herein. In another example, a non-transitory computer-readable storage medium stores thereon executable instructions that, as a result of being executed by one or more processors of a computer system, cause the computer system to perform the processes described herein.

DESCRIPTION OF EXAMPLE EMBODIMENTS

Figure 7:
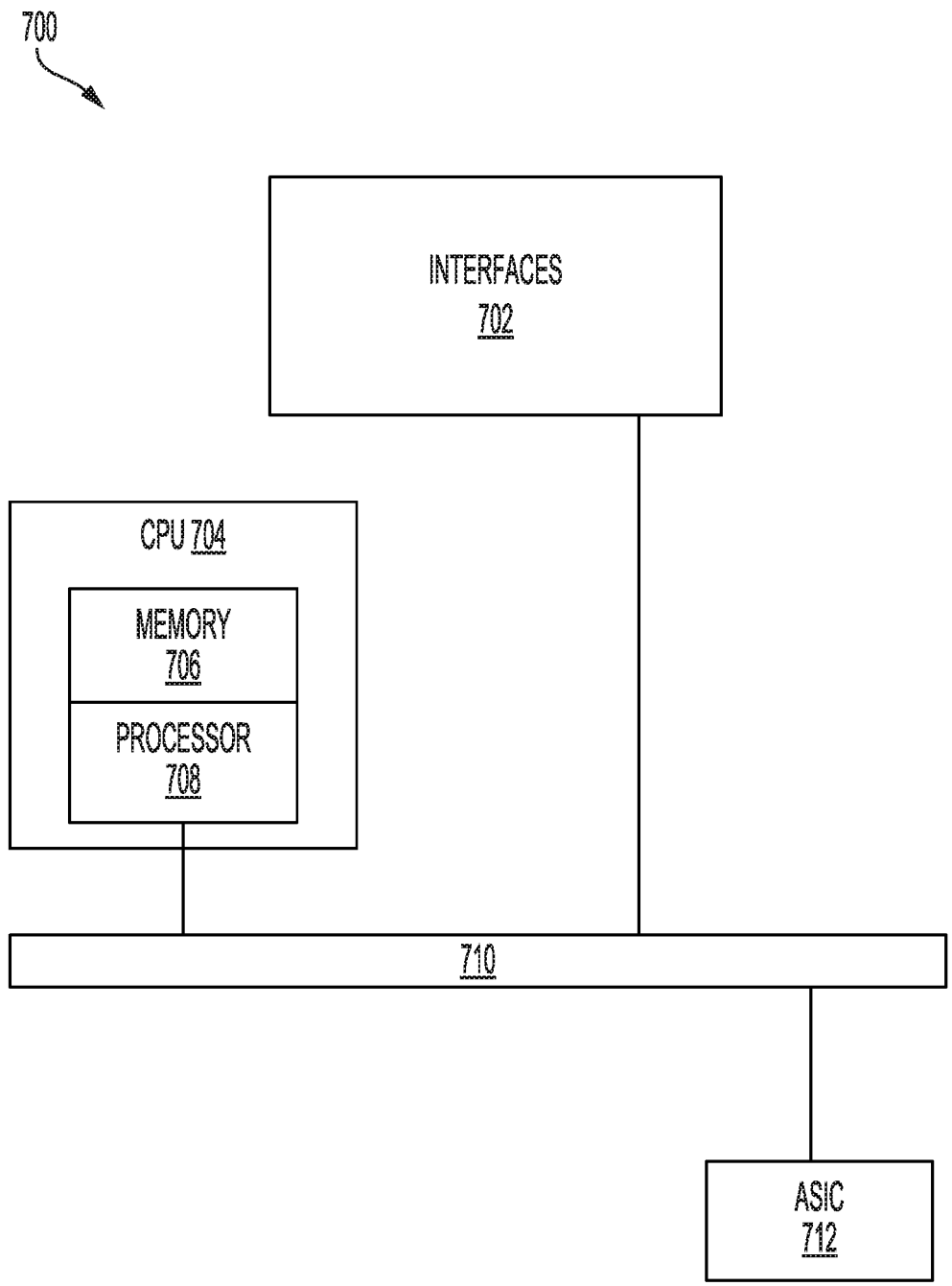
FIG. 7 illustrates an example network device suitable for performing switching, routing, and other networking operations in accordance with some implementations.
Figure 8:
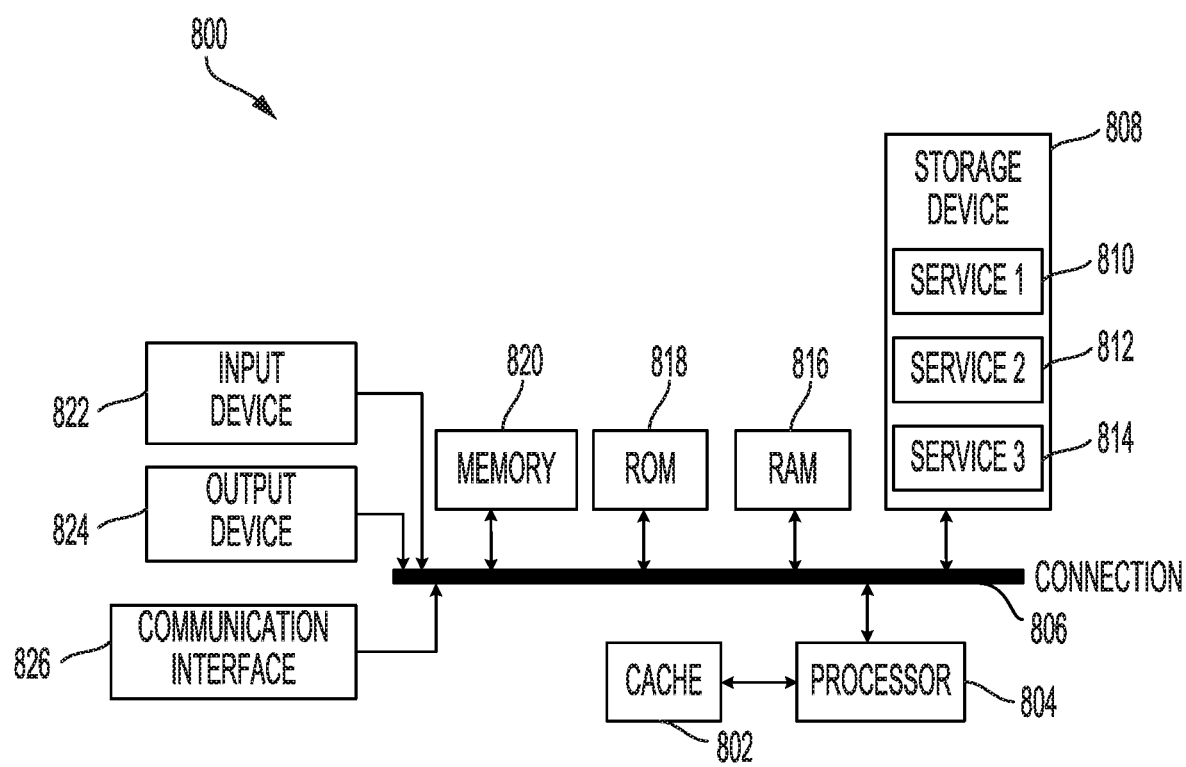
FIG. 8 illustrates a computing system architecture including various components in electrical communication with each other using a connection in accordance with some implementations.

Disclosed herein are systems, methods and computer-readable storage media for providing real-time remote attestation for network enclaves across enclave servers, physical and virtual network devices, and applications operating within the enclave domain. The present technologies will be described in more detail in the following disclosure as follows. The discussion begins with a detailed description of example systems, processes and environments for providing redundancy within a wireless communications network using network slices provided by various vendors, as illustrated in FIGS. 1 through 6, will then follow. The discussion concludes with a description of an example network and computing devices, as illustrated in FIGS. 7 and 8.

FIG. 1 shows an illustrative example of an environment 100 in which a network slice controller 122 activates a backup network slice 104 as a result of a determination of a failure of an active network slice 102 in accordance with various implementations. In the environment 100, a network slice controller 122 is implemented within a mobile communications network, whereby the mobile communications network may include various network slices, which may be used to separate different types of network traffic which can be used in different network architectures (e.g., networks employing network function virtualization (NFV), etc.). A network slice may include a collection of logical network functions that support the wireless communications network requirements for particular use cases. Through the use of network slicing, different operators may have distinct core networks that operate using the same physical set of network and computing resources. Network slices may also be used to create a virtual network that is dedicated to particular types of network traffic. Network slices are further defined in the 3$^{rd}$ Generation Partnership Project (3GPP) Technical Specification (TS) 23.501, "System Architecture for the 5G System (5GS)," Release 16, Version 16.4.0, dated Mar. 27, 2020 and hereby incorporated in its entirety by reference.

In one aspect, a wireless communications network implements, for an active network slice 102, a backup network slice 104 that provides redundancy for the active network slice 102 in the event of a failure of the active network slice 102. The active network slice 102 and the backup network slice 104 may be provided by different vendors and each provide the same or similar network functionality. For instance, as illustrated in FIG. 1, the active network slice 102 may provide a network repository function (NRF) 106, a policy control function (PCF) 108, a session management function (SMF) 110, and a user plane function (UPF) 112, although the active network slice 102 may provide additional, fewer, and/or alternative network functions as required in the wireless communications network. Similarly, the backup network slice 104 may be implemented to include its own NRF 114, PCF 116, SMF 118, and UPF 120. The backup network slice 104 may operate on standby until required (e.g., in the event of a failure of the active network slice 102, etc.) or may handle network traffic concurrently with the active network slice 102 but maintain available capacity to perform the various functions of the active network slice 102 in the event of failure of the active network slice 102.

The NRF 106 enables every network function to discover services offered by other network functions. For instance, the NRF 106 may maintain an updated repository of the wireless communications network elements in the wireless communications network along with services provided by each of the elements in the network core that are to be instantiated, scaled, etc. The NRF 106 may support the service discovery function, whereby the NRF 106 is configured to obtain network function discovery requests from network function instances and to provide information about any discovered network function instances. The NRF 106 may be network slice-specific or network slice-independent.

The PCF 108 supports the unified policy framework that governs network behavior. For instance, the PCF 108 may provide policies for control plane functions, including network slicing, roaming, and mobility management. Further, the PCF 108 may access subscription information for policy decisions taken by a unified data repository (UDR), which can be used to service a number of network functions. The PCF 108 may also support the 5G Quality of Service (QoS) policy and charging control functions. The PCF 108 may be network slice-specific or network slice-independent.

The SMF 110 performs the session management functions, such as allocating IP addresses to different User Equipment (UEs) 128, performing Non-Access Stratum (NAS) signaling for session management, and sending QoS and policy information to the radio access network (RAN). Further, the SMF 110 may select and control the UPF 112 for network traffic routing. The SMF 110 may further act as an interface for all network communication related to offered user plane services. The SMF 110 may determine how the policy and charging for these services is applied.

The UPF 112 performs data packet routing and forwarding within the wireless communications network. Further, the UPF 112 may perform data packet inspection and QoS handling. For instance, the UPF 112 may integrate a Deep Packet Inspection (DPI) for data packet inspection and classification. The UPF 112 may also connect to the Internet Point of Presence (POP), whereby the UPF 112 may integrate the firewall and network address translation (NAT) functions. The UPF 112 may also provide a mobility anchor for Intra Radio Access Technology (RAT) and Inter-RAT handovers. The UPF 112 can also maintain and report network traffic statistics, as needed.

In one aspect, the active network slice 102 and the backup network slice 104 have the same Single-Network Slice Selection Assistance Information (S-NSSAI) value but have different network slice instance identifiers as a result of these network slices 102, 104 being provided by different vendors. The active network slice 102 and the backup network slice 104 may both be connected to a common Access and Mobility Management Function (AMF) 126 via a network slice controller 122.

In one aspect, a UE 128 registers with the wireless communications network and establishes, via the AMF 126, a PDU session with the active network slice 102. The Unified Data Management (UDM) of the wireless communications network may store the IP address allocated to the UE 128. The UDM may manage network user data in a centralized element. The UDM may be paired with a user data repository (UDR) that stores user data such as customer profile information, customer authentication information, cryptographic information (e.g., keys, etc.), and the like. The UDM may be implemented on the control plane and may communicate between the user plane and the control plane.

The various network functions of the active network slice 102 may transmit health monitoring information to a network slice controller 122 of the wireless communications network. For instance, the health monitoring information may be provided to the network slice controller 122 using communications based on Network Configuration Protocol (NETCONF), Yet Another Next Generation (YANG) modeling language, and the like. In one aspect, the health monitoring information is transmitted to the network slice controller 122 in response to a request from the network slice controller 122 for the health monitoring information. Alternatively, the health monitoring information may be transmitted to the network slice controller 122 by the various NFs of the active network slice periodically or in response to a triggering event (e.g., data packet loss, hardware failure, software failure, slice migration, etc.). The health monitoring information may include data packet input/output speeds, latency, losses, available processing and network capacity, available network bandwidth, and the like.

The network slice controller 122, in one aspect, is a network orchestrator that interfaces with various functionalities performed by each network layer to manage network slice requests. For instance, the network slice controller 122 may map various service instances expressed in terms of service-level agreement (SLA) requirements with network functions capable of satisfying service constraints. Further, the network slice controller 122 may provide virtualization of physical network resources in order to simplify the resources management operations performed to allocate network functions. The network slice controller 122 may also monitor the performance of each network slice across the various network layers in order to dynamically reconfigure each network slice to accommodate SLA requirement modifications.

The network slice controller 122, in one aspect, is configured to analyze the provided health monitoring information from the network functions of the active network slice 102 to determine if the active network slice 102 has failed. The network slice controller 122 may use the provided health monitoring information to identify critical events that may be impacting the performance of the active network slice 102. To identify these critical events, the network slice controller 122 may obtain a set of policies specific to the active network slice 102 that define a set of thresholds and/or conditions that, if satisfied, indicate the occurrence of a critical event. The policies may be provided by a vendor of the active network slice 102 or may be defined by an administrator or service that operates the wireless communications network and the active network slice 102.

The policies, in some implementations, are vendor specific for a particular network slice. For instance, the policies may define a set of thresholds specific to network slices provided by a particular vendor and a different set of thresholds specific to network slices provided by a different vendor. The policies may define different thresholds that, if met, may indicate the occurrence of different events that may impact the performance of the active network slice 102. For example, the policies may define a latency threshold whereby a critical event impacting the performance of the active network slice 102 occurs if the latency of the active network slice 102 is greater than the latency threshold. As another example, the policies may define a data packet loss threshold whereby a critical event impacting the performance of the active network slice 102 occurs if the data packet loss for the active network slice 102 is greater than the data packet loss threshold defined in the set of policies for the active network slice 102. Thus, based on the evaluation of the health monitoring information for the active network slice 102 and the set of network slice policies for the active network slice, the network slice controller may identify a set of critical events that may be impacting the performance of the active network slice 102.

In one aspect, if the network slice controller 122 determines, based on the evaluation of the health monitoring information for the active network slice 102 against the set of applicable policies, that the active network slice 102 has failed, the network slice controller 122 activates the backup network slice 104 to serve as the new active network slice for the wireless communications network. The network slice controller 122 may configure the same IP address pool used by the active network slice 102 on to the backup network slice 104 that is to serve as the new active network slice. Further, the network slice controller 122 may provision the newly active network slice instance in the NSSF 124 of the wireless communications network.

The NSSF 124 is configured to assist with the selection of the network slice instances that will serve a particular device, such as UE 128. For instance, the NSSF 124 may determine the permitted S-NSSAI values that can be supplied to the UE 128. Further, the NSSF 124 may be used to allocate an AMF in the event that the current AMF is not able to support all network slice instances for a given UE 128.

In one aspect, the network slice controller 122 further transmits an instruction to the AMF 126 to trigger a network slice change from the active network slice 102 to the backup network slice 104 that is to serve as the new active network slice. This instruction may specify the S-NSSAI of the backup network slice 104. The AMF 126, in some implementations, is configured to support registration management, access control and mobility management functions for 3GPP accesses as well as non-3GPP accesses such as wireless local area networks (WLANs). The AMF 126 may also receive mobility related policies from the PCF 108, 116 (e.g., mobility restrictions) and forwards these to the UE 128.

In response to the instruction, the AMF 126 may trigger a PDU session disconnection between the UE 128 and the active network slice 102. The UE 128 may be engaged with the active network slice 102 via the UPF 112 of the active network slice. 102 The PDU session may be an IP type PDU session whereby the active network slice 102 is used to transport IPv4 and/or IPv6 data packets from the UE 128 to the UPF 112 and vice versa. Alternatively, the PDU session may be an Ethernet type PDU session, whereby the active network slice 102 provides the UE 128 with Ethernet connectivity and transports Ethernet frames. The UE 128 may disconnect from the PDU session in response to the notification or other indication from the AMF 126. In one aspect, the AMF 126 indicates, to the UE 128, that the UE 128 is to re-establish the PDU session while the restoration of the active network slice 102 is performed.

In one aspect, the AMF 126 obtains a request from the UE 128 to establish a new PDU session. The request may include the S-NSSAI of the backup network slice 104 that is to serve as the new active network slice. In response to the PDU session request, the AMF 126 may query the NSSF 124 of the wireless communications network to identify the network slice instance for the PDU session. The AMF 126 may query the NSSF 124 with the S-NSSAI provided by the UE 128, which the NSSF 124 may use to identify the network slice instance (e.g., network slice) that is to be used for the provided S-NSSAI. Once the AMF 126 identifies the network slice instance to be used for the PDU session, the AMF 126 may re-establish the PDU session between the UE 128 and the backup network slice 104. In one aspect, the AMF 126 obtains the old IP address from the UDM and the new PDU session is established between the UE 128 and the backup network slice 104 using the old IP address.

Figure 2:
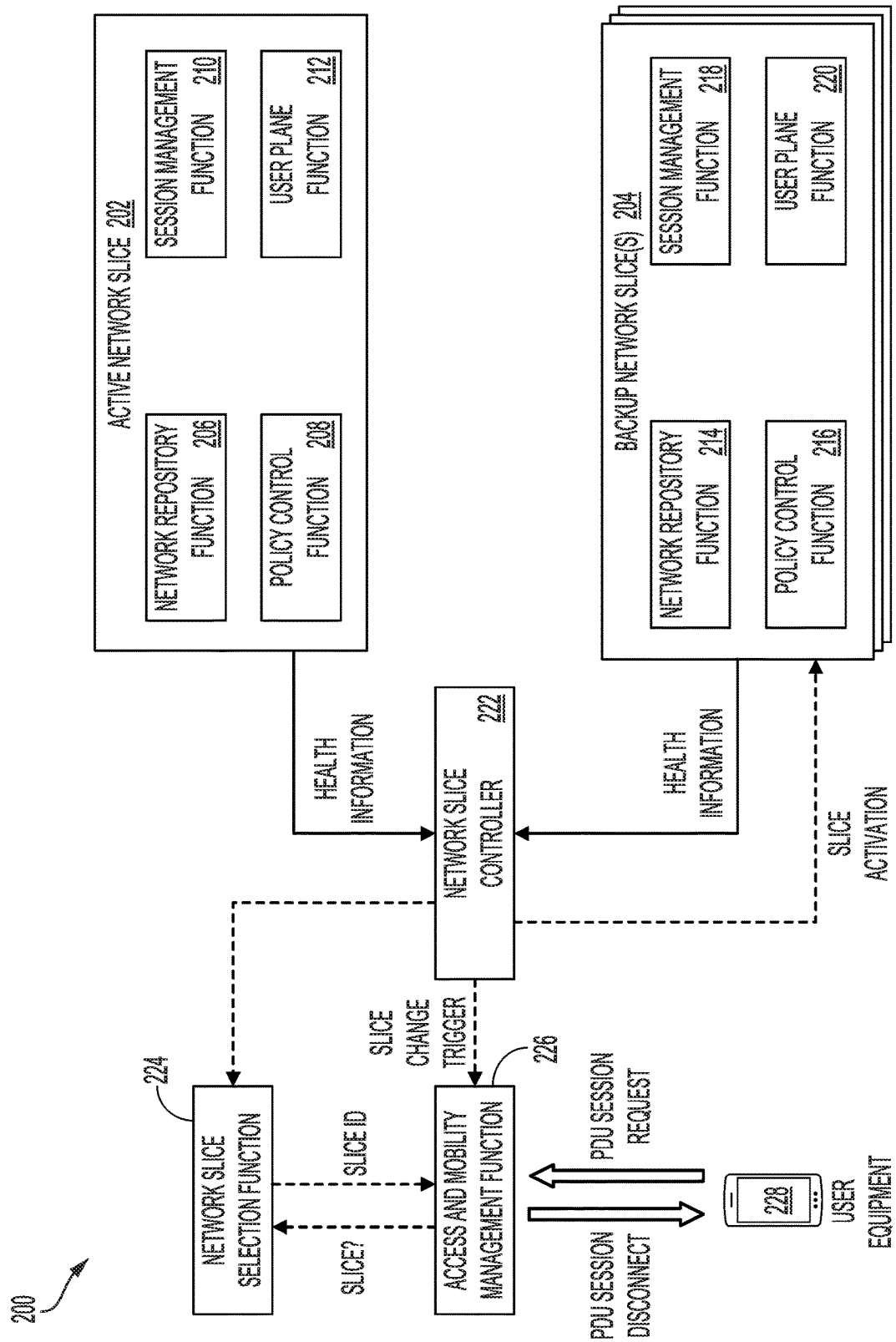
FIG. 2 shows an illustrative example of an environment in which a network slice controller activates one or more backup network slices as a result of a determination of a failure of an active network slice in accordance with various implementations.

FIG. 2 shows an illustrative example of an environment 200 in which a network slice controller 222 activates one or more backup network slices 204 as a result of a determination of a failure of an active network slice 202 in accordance with various implementations. The environment 200 may include similar elements to those described above in connection with FIG. 1. For instance, the environment 200, which may represent a wireless communications network, may include a network slice controller 222, a NSSF 224, and an AMF 226, whereby each of these elements may perform similar functions to their respective analogs described above in connection with FIG. 1.

In the environment 200, redundancy and failover support for the active network slice 202 is provided using a plurality of backup network slices 204 (e.g., an N number of backup network slices, wherein N is greater than one). The active network slice 202 may be similar to the active network slice 102 described above, whereby the active network slice 202 may include a NRF 206, PCF 208, SMF 210, and UPF 212. Each of the backup network slices 204 may also include a NRF 214, PCF 216, SMF 218, and a UPF 220. However, in some instances, the NRF and PCF may be slice-specific or slice-independent.

In one aspect, the active network slice 202 and the plurality of backup network slices 204 each have a different S-NSSAI value. Further, the wireless communications network may include a plurality of AMFs, whereby each AMF is slice specific. For instance, the AMF 226 may be specific and tailored to the active network slice 202. Thus, the AMF 226 may not support any of the backup network slices 204 implemented in the wireless communications network. However, in some implementations, the AMF 226 can be configured to support all network slices within the wireless communications network. Thus, in these implementations, the network slices 202, 204 may be deployed with a common AMF.

The one or more backup network slices 204 for the active network slice 202 may be active and handling other UE sessions. For instance, one or more of the backup network slices 204 may be performing the functions of the active network slice 202 for UEs other than UE 228. In some instances, the one or more backup network slices 204 may reserve computing and network resources in order to support failover of the active network slice 202 in the event of a failure of the active network slice 202. Alternatively, in some implementations, individual backup network slices 204 are configured to serve as a backup for certain functions of the active network slice 202 such that, in the event of a failure of the active network slice 202, a subset of the backup network slices 204 may be selected that can collectively perform the functions of the active network slice 202. In some implementations, one or more of the plurality of backup network slices 204 operate on standby and, thus, are reserved exclusively to provide redundancy for the active network slice 202.

In one aspect, the UE 228 registers with the wireless communications network via the AMF 226 and establishes a PDU session with the active network slice 202. The UDM of the wireless communications network may store the IP address allocated to the UE 228. The wireless communications network may be implemented with a single UDM and NSSF 224 for all network slices. Alternatively, if the wireless communications network is configured with multiple UDMs and NSSFs, these UDMs and NSSFs may each have the same configuration.

In one aspect, the network functions of the active network slice 202 and each of the backup network slices 204 transmits health monitoring information to the network slice controller 222. The health monitoring information may be provided to the network slice controller 222 using communications based on NETCONF, YANG, and the like. The health monitoring information may be transmitted to the network slice controller 222 in response to a request from the network slice controller 222 for the health monitoring information. Alternatively, the health monitoring information may be transmitted to the network slice controller 222 by the various network functions of the network slices periodically or in response to a triggering event. The health monitoring information may include data packet input/output speeds, latency, available processing and network capacity, available network bandwidth, and the like.

In response to obtaining the health monitoring information from the active network slice 202 and the backup network slices 204, the network slice controller 222 may analyze the health monitoring information to determine if the active network slice 202 has encountered a critical event that corresponds to a failure of the active network slice 202. For instance, the network slice controller 222 may identify one or more policies of the active network slice 202 that may define one or more criteria that, if met, correspond to a critical event, such as a slice failure. The network slice controller 222 may evaluate the obtained health monitoring information against these policies to determine whether any of the one or more criteria have been met. If so, the network slice controller 222 may detect that the active network slice 202 has failed. As noted above, the set of policies may be vendor specific, whereby the active network slice 202 and the applicable set of policies may be implemented by a vendor. Policies that may be applicable to the backup network slices 204 may be defined by the vendors that have provisioned the backup network slices 204. These vendors may be different from the vendor that provided the active network slice 202.

If the network slice controller 222 determines, based on the health monitoring information and the corresponding set of policies, that the active network slice 202 has failed, the network slice controller 222 may identify one or more backup network slices from the plurality of backup network slices 204 that may be activated in order to provide the functionality of the active network slice 202. For instance, the network slice controller 222 may determine the configuration of the active network slice 202 and the performance requirements of the active network slice 202. Based on the configuration and performance requirements of the active network slice 202, the network slice controller 222 may identify a backup network slice from the plurality of backup network slices 204 that has a configuration similar to that of the active network slice 202 and that is capable of satisfying the performance requirements of the active network slice 202.

In one aspect, if the network slice controller 222 determines that a single backup network slice is unable to satisfy the performance requirements of the active network slice 202, the network slice controller 222 selects additional backup network slices that may each provide a subset of the performance requirements of the active network slice 202. For instance, each backup network slice may be selected to perform a subset of operations of a set of operations previously performed by the active network slice 204. As noted above, each of the backup network slices 204 may be implemented to provide redundancy for one or more functions of the active network slice 202. Thus, the network slice controller 222 may identify a subset of backup network slices 204 that collectively provide the functionality and performance of the active network slice 202.

In one aspect, the network slice controller 222 configures the one or more IP address pools of the active network slice 202 on to the selected backup network slices 204 that are to be activated to provide the functionality and performance of the active network slice 202. For instance, the network slice controller 222 may configure these one or more IP address pools on to the backup network slices 204 to enable these backup network slices 204 to provide the functionality of the active network slice and allocate IP addresses to PDU sessions between UEs and the backup network slices 204. In one aspect, the network slice controller stores allocated UE IP configuration for existing sessions with the active network slice to a UDM or other network repository to support migration of these existing sessions to the one or more backup network slices while preserving the IP addresses for the UE sessions.

Similar to the process described above in connection with FIG. 1, the network slice controller 222 may transmit a network slice change trigger (e.g., instruction, indication, etc.) to the AMF 226 with the S-NSSAI values of the one or more backup network slices 204 that are to serve as the new active network slices. In response to the trigger, the AMF 226 may configure the UE 228 with the network slice identifiers indicated by the network slice controller 222. Further, the AMF 226 may trigger a PDU session disconnection between the UE 228 and the active network slice 202. The UE 228 may disconnect from the PDU session in response to the notification or other indication from the AMF 226. In one aspect, the AMF 226 indicates, to the UE 228, that the UE 228 is to re-establish the PDU session while the restoration of the active network slice 202 is performed.

In one aspect, if the AMF 226 does not support the one or more network slices corresponding to the network slice identifiers provided to the UE 228, the AMF 226 initiates an AMF relocation procedure to register the UE 228 with an AMF that supports the one or more network slices. Alternatively, the AMF 226 may deregister the UE 228 and transmit an indication to the UE 228 to reregister with the wireless communication network. This may cause the UE 228 to transmit a new registration request to the AMF that supports the requested network slice identifier. Upon registration with the AMF that supports the requested network slice, the UE 228 may transmit a PDU session request to the new AMF.

In response to receiving a new PDU session request from the UE 228, the AMF 226 (or other AMF that supports the network slice corresponding to the provided network slice identifier) may query the NSSF 224 to identify the backup network slice corresponding to the provided identifier. In response to the query, the NSSF 224 may reply with one of the network slice instance identifiers of a backup network slice. In one aspect, the NSSF 224 evaluates one or more network operator policies to determine how the network load from the active network slice 202 is to be distributed among the one or more backup network slices 204 made available as a result of the failure of the active network slice 202. In one aspect, if IP address preservation is enabled, the NSSF 224 may return, in response to the query from the AMF 226, an identifier corresponding to the backup network slice provided with an IP address pool that includes the original IP address.

In response to obtaining a network slice instance identifier from the NSSF 224 corresponding to the S-NSSAI provided by the UE 228, the AMF 226 may establish the new PDU session between the UE 228 and the one or more backup network slices 204. The PDU session may be established using standard 3GPP procedures.

Figure 3:
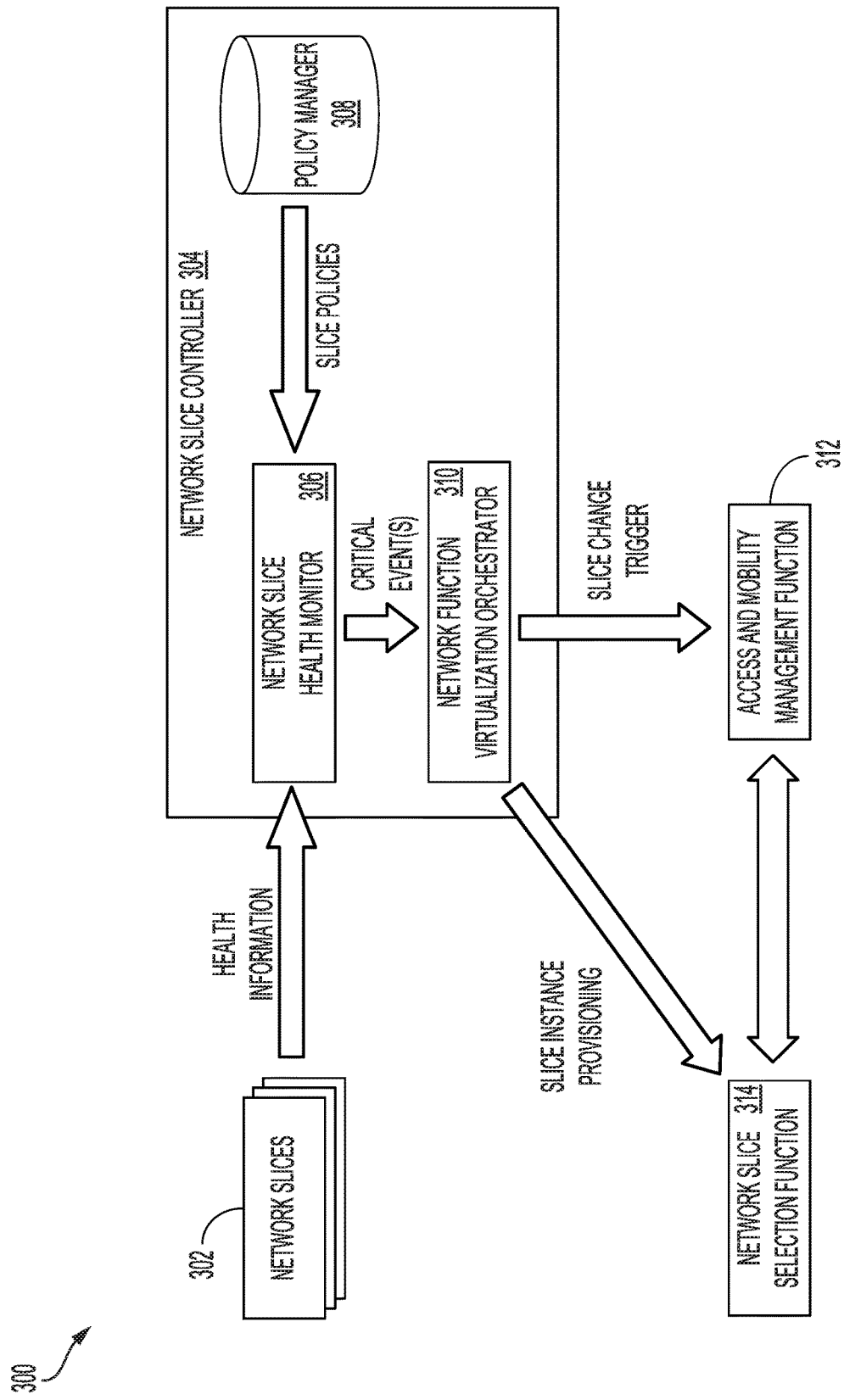
FIG. 3 shows an illustrative example of an environment in which a network slice health monitor of a network slice controller evaluates health information from one or more network slices to detect failure of an active network slice and cause activation of backup network slices in accordance with various implementations.

FIG. 3 shows an illustrative example of an environment 300 in which a network slice health monitor 306 of a network slice controller 304 evaluates health information from one or more network slices 302 to detect failure of an active network slice and cause activation of backup network slices in accordance with various implementations. In the environment 300, a network slice health monitor 306 may obtain health monitoring information from one or more network slices 302 of the wireless communications network. The network slices 302 may include an active network slice and one or more backup network slices implemented to provide redundancy for the active network slice in the event of failure of the active network slice. The one or more backup network slices may be implemented as part of a 1:1 or 1:N redundancy model for the active network slice. Further, the active network slice and each of the one or more backup network slices may be provided by different vendors such that, while providing similar functionality, the logical configuration of each network slice 302 may differ from that of one another.

In one aspect, each network slice 302 may transmit health monitoring information to a network slice health monitor 306 of the network slice controller 304. As noted above, the health monitoring information may be provided using communications based on NETCONF, YANG, and the like. The health monitoring information may be transmitted to the network slice health monitor 306 in response to a request from the network slice controller 304 for the health monitoring information. Alternatively, the health monitoring information may be transmitted to the network slice health monitor 306 by the various network functions of the network slices 302 periodically or in response to a triggering event.

In one aspect, the network slice controller 304 includes a policy manager 308. The policy manager 308 may include a database comprising various entries corresponding to different network slice policies. Each of the network slice policies may be vendor specific. For instance, one or more network slice policies may correspond to network slices provided by a particular vendor. Thus, in response to obtaining the health monitoring information from the one or more network slices 302, the network slice health monitor 306 may determine, from the policy manager 308, which policies are applicable to the one or more network slices 302.

Based on the one or more applicable policies obtained from the policy manager 308 and the obtained health monitoring information, the network slice health monitor 306 may determine whether the active network slice has failed.

For instance, the one or more policies of the active network slice may define one or more criteria that, if met, correspond to a critical event, such as a slice failure. The network slice health monitor 306 may evaluate the obtained health monitoring information against these policies to determine whether any of the one or more criteria have been met. If so, the network slice health monitor 306 may detect that the active network slice has failed.

In one aspect, if the network slice health monitor 306 determines that the active network slice has failed, the network slice health monitor 306 may transmit information corresponding to the critical events corresponding to the failure to the network function virtualization orchestrator 310 of the network slice controller 304. In response to obtaining an indication that the active network slice has failed, the network function virtualization orchestrator 310 may identify the one or more backup network slice instances that are to be activated and distributes the one or more IP address pools of the active network slice to the one or more backup network slice instances. Additionally, the network function virtualization orchestrator 310 may configure the IP address pools of the active network slice onto these newly active network slice instances. The network function virtualization orchestrator 310 may activate the one or more backup network slices in order to provide the functionality of the active network slice. In some instances, the network function virtualization orchestrator 310 may coordinate with the NSSF 314 to provision the network slice instances for the one or more backup network slices.

In one aspect, the network function virtualization orchestrator 310 transmits a network slice change trigger to the AMF 312. This may cause the AMF 312 to initiate a PDU session disconnection between a UE and the active network slice. The AMF 312 may provide the S-NSSAI values of the one or more backup network slices to the UE and deregister the UE from the wireless communications network. The UE may transmit a new request to the AMF 312 (or to the AMF that supports the one or more backup network slices) to register with the wireless communications network. Further, the UE may submit a new request to establish a PDU session between the UE and the one or more backup network slices.

In response to receiving the PDU session request from the UE, the AMF 312 may query the NSSF 314 to determine the network slice instance for the PDU session. The NSSF 314 may reply to the query with the one or more network slice instance identifiers of the one or more backup network slices. In some instances, the NSSF 314 may maintain network operator policies that may be used to determine how to distribute the network load of the active network slice to the available backup network slice instances. In one aspect, if IP address preservation is enabled, the NSSF 314 may return the identifier of the network slice instance which owns the corresponding IP address that was preserved for the PDU session. The AMF 312 may establish the PDU session between the UE and the identified backup network slices using standard 3GPP procedures.

Figure 4:
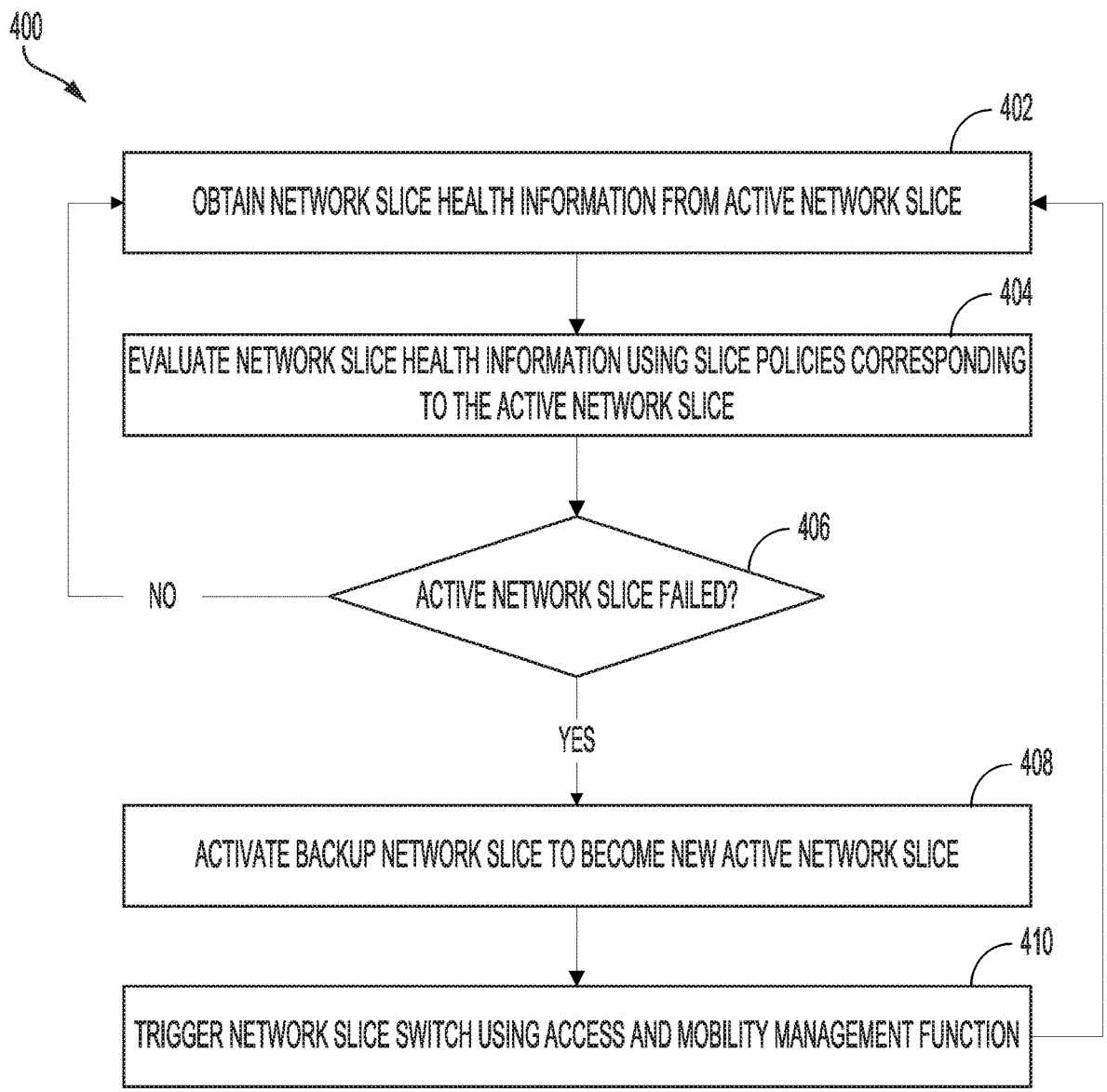
FIG. 4 shows an illustrative example of a process for activating a backup network slice to serve as a new active network slice as a result of a determination that an active network slice has failed in accordance with some implementations.

FIG. 4 shows an illustrative example of a process 400 for activating a backup network slice to serve as a new active network slice as a result of a determination that an active network slice has failed in accordance with some implementations. The process 400 may be performed by the network slice controller, which may detect failure of an active network slice and activate a backup network slice to provide the functionality of the active network slice. The process 400 may be performed within a wireless communications network environment that utilizes a 1:1 network slice redundancy model, whereby each network slice is configured with the same S-NSSAI value but with different network slice instance identifiers.

In one aspect, the network slice controller obtains, at step 402, network slice health information from the active network slice. For instance, the network functions (NFs) of the active network slice may provide health monitoring information to the network slice controller. The health monitoring information may be provided to the network slice controller using communications based on NETCONF, YANG, and the like. In one aspect, the health monitoring information is transmitted to the network slice controller in response to a request from the network slice controller for the health monitoring information. Alternatively, the health monitoring information may be transmitted to the network slice controller by the various NFs of the active network slice periodically or in response to a triggering event (e.g., data packet loss, hardware failure, software failure, slice migration, etc.). The health monitoring information may include data packet input/output speeds, latency, available processing and network capacity, available network bandwidth, and the like.

In response to obtaining the health monitoring information from the active network slice, the network slice controller may, at step 404, evaluate the network slice health monitoring information of the active network slice using a set of policies corresponding to the active network slice. These policies may be provided by a vendor or other provider of the active network slice. Alternatively, the policies may be defined by an administrator or service that operates the wireless communications network and the active network slice. The policies, in some implementations, are vendor specific for a particular network slice. For instance, the policies may define a set of thresholds specific to network slices provided by a particular vendor and a different set of threshold specific to network slices provided by a different vendor. The policies may define different thresholds that, if met, may indicate the occurrence of different events that may impact the performance of the active network slice. For example, the policies may define a latency threshold whereby a critical event impacting the performance of the active network slice occurs if the latency of the active network slice is greater than the latency threshold. As another example, the policies may define a data packet loss threshold whereby a critical event impacting the performance of the active network slice occurs if the data packet loss for the active network slice is greater than the data packet loss threshold defined in the set of policies for the active network slice. Thus, based on the evaluation of the health monitoring information for the active network slice and the set of network slice policies for the active network slice, the network slice controller may identify a set of critical events that may be impacting the performance of the active network slice.

At step 406, the network slice controller may determine whether the active network slice has failed. For instance, the network slice controller may evaluate the set of critical events to determine whether any of these correspond with a failure of the active network slice. Such critical events that may be indicative of a failure of the active network slice may include, but are not limited to, a network layer failure, a Session Management Function (SMF) software failure, a User Plane Function (UPF) software failure, a detection of significant data packet loss, a manual migration of the active network slice being performed, a network interface (e.g., N3, N4, N11, etc.) failure, detection of a UE session-drop count exceeding a threshold value, a network slice hardware failure, a single or plurality of node failures that exceed an operator or vendor defined threshold, and the like.

In some aspects, if the network slice controller determines that the active network slice has not failed, the network slice controller continues to obtain and process network slice health monitoring health information of the active network slice. For instance, the network slice controller may restart the process 400 and obtain, at step 402, new network slice health monitoring information for the active network slice from the various NFs of the active network slice. However, if the network slice controller determines, based on the critical events detected using the network slice health monitoring information and the set of policies corresponding to the active network slice, that the active network slice has failed, the network slice controller may activate, at step 408, the backup network slice to become the new active network slice. The network slice controller may configure the same IP address pool used by the active network slice on to the backup network slice that is to serve as the new active network slice. Further, the network slice controller may provision the newly active network slice instance in the Network Slice Selection Function (NSSF) of the wireless communications network.

In one aspect, the network slice controller, at step 410, triggers a network slice switch using the AMF. For instance, the network slice controller may transmit a network slice change trigger to the AMF, which may cause the AMF to trigger a PDU session disconnection with the UE. Further, the network slice controller may transmit an indication for the UE to re-connect. Once the PDU session has been disconnected, the UE may transmit a new PDU session request to the AMF. In response to receiving the new PDU session request from the UE, the AMF may query the NSSF for the network slice instance for the new PDU session that is to be established. The NSSF may respond to the query by providing an identifier corresponding to the newly active network slice. The AMF may obtain the old IP address from the Unified Data Management (UDM) and the new PDU session between the UE and the newly active network slice is established.

Figure 5:
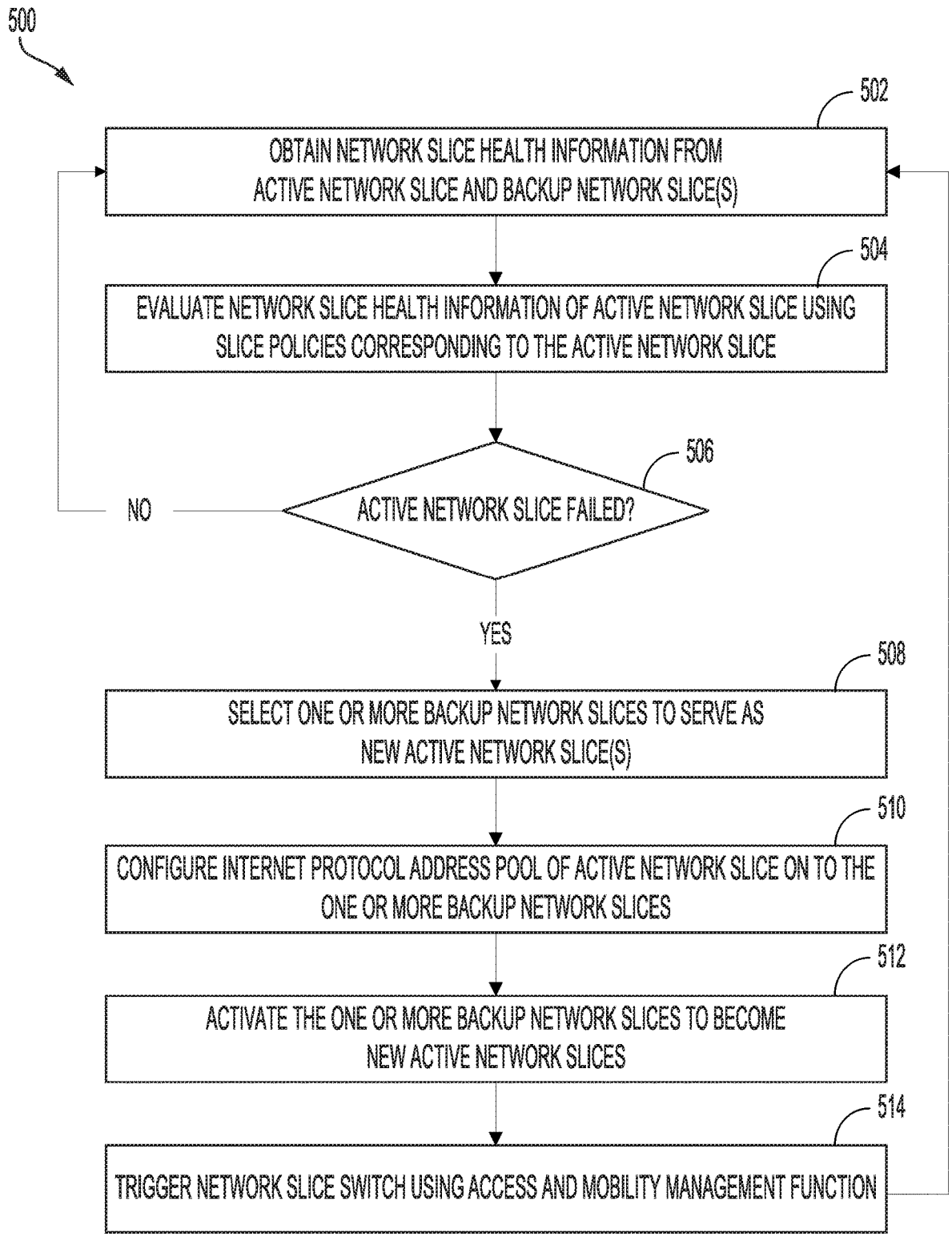
FIG. 5 shows an illustrative example of a process for activating one or more backup network slices to serve as new active network slices as a result of a determination that an active network slice has failed in accordance with some implementations.

FIG. 5 shows an illustrative example of a process 500 for activating one or more backup network slices to serve as new active network slices as a result of a determination that an active network slice has failed in accordance with some implementations. The process 500 may be performed by the network slice controller, which may detect failure of an active network slice and activate one or more backup network slices to provide the functionality of the active network slice to the user equipment. The process 500 may be performed within a wireless communications network environment that utilizes a 1:N network slice redundancy model, whereby each network slice is configured with a different network slice identifier. For instance, each network slice may have a different Single-Network Slice Selection Assistance Information (S-NSSAI) value.

In one aspect, the network slice controller obtains, at step 502, network slice health information from the active network slice and each of the backup network slices. For instance, the NFs of each of the network slices may provide health monitoring information to the network slice controller. The health monitoring information may be provided to the network slice controller using communications based on NETCONF, YANG, and the like. In one aspect, the health monitoring information is transmitted to the network slice controller in response to a request from the network slice controller for the health monitoring information. Alternatively, the health monitoring information may be transmitted to the network slice controller by the various NFs of the network or of the network slices periodically or in response to a triggering event (e.g., data packet loss, hardware failure, software failure, slice migration, etc.). The health monitoring information may include data packet input/output speeds, latency, available processing and network capacity, available network bandwidth, and the like.

At step 504, the network slice controller may evaluate the health monitoring information of the active network slice using a set of network slice policies corresponding to the active network slice. The network slice policies may be defined by an operator or other provider of the active network slice (e.g., vendor, etc) Similar to the policies described above with regard to FIG. 4, the policies may define different thresholds that, if met, may indicate the occurrence of different events that may impact the performance of the active network slice. Based on the evaluation of the health monitoring information for the active network slice and the set of network slice policies for the active network slice, the network slice controller may identify a set of critical events that may be impacting the performance of the active network slice.

Based on the set of critical events identified by the network slice controller via evaluation of the health monitoring information of the active network slice using the set of network slice policies, the network slice controller may determine, at step 506, whether the active network slice has failed. For instance, a critical event identified by the network slice controller may denote failure of the active network slice as a result of a network layer failure, failure of the Session Management Function (SMF) software, failure of User Plane Function (UPF) software, significant data packet loss, manual migration of the active network slice rendering the active network slice offline, interface failure (e.g., N3, N4, N11, etc.), user equipment (UE) session-drop count exceeding a pre-defined threshold, network slice hardware failures, and the like.

If the network slice controller determines that the active network slice is operational and has not failed, the network slice controller may restart the process 500 and obtain, at step 502, new network slice health monitoring information for the active network slice and for the backup network slices from the various NFs of these network slices. However, if the network slice controller determines that the active network slice has failed, the network slice controller selects, at step 508, one or more backup network slices that are to serve as the new active network slices. For instance, the network slice controller may determine the configuration of the active network slice and the performance requirements of the active network slice. Based on the configuration and performance requirements of the active network slice, the network slice controller may identify a backup network slice that has a configuration similar to that of the active network slice and that is capable of satisfying the performance requirements of the active network slice. In one aspect, if the network slice controller determines that a single backup network slice is unable to satisfy the performance requirements of the active network slice, the network slice controller selects additional backup network slices that may each provide a subset of the performance requirements of the active network slice. For instance, each backup network slice may be selected to perform a subset of operations of a set of operations previously performed by the active network slice.

In one aspect, the network slice controller configures, at step 510, the one or more Internet Protocol (IP) address pools of the active network slice on to the one or more backup network slices. For instance, the network slice controller may distribute the IP address pools of the active network slice on to the one or more backup network slices. Further, the network slice controller may configure these one or more IP address pools on to the backup network slices to enable these backup network slices to provide the functionality of the active network slice and allocate IP address to PDU sessions between user equipment and the backup network slices. In one aspect, the network slice controller stores allocated UE IP configuration for existing sessions with the active network slice to a UDM or other network repository to support migration of these existing sessions to the one or more backup network slices while preserving the IP addresses for the UE sessions.

The network slice controller, at step 512, may activate the one or more backup network slices to serve as the new active network slices for the wireless communications network. Further, the network slice controller may, at step 514, trigger a network slice switch using the AMF. For instance, the network slice controller may transmit, to the AMF, a slice change trigger that includes the S-NSSAI of the one or more backup network slices that are to serve as the new active network slices for the wireless communications network. This may cause the AMF to configure the UE with the slice identifier (e.g., S-NSSAI) indicated by the network slice controller, as described in greater detail in connection with FIG. 6. Once the network slice controller has activated the one or more backup network slices to serve as the new active network slices for the wireless communications network, the network slice controller may restart the process 500 by obtaining, at step 502, the network slice health monitoring information from the new active network slices and any backup network slices configured to provide redundancy for these new active network slices.

Figure 6:
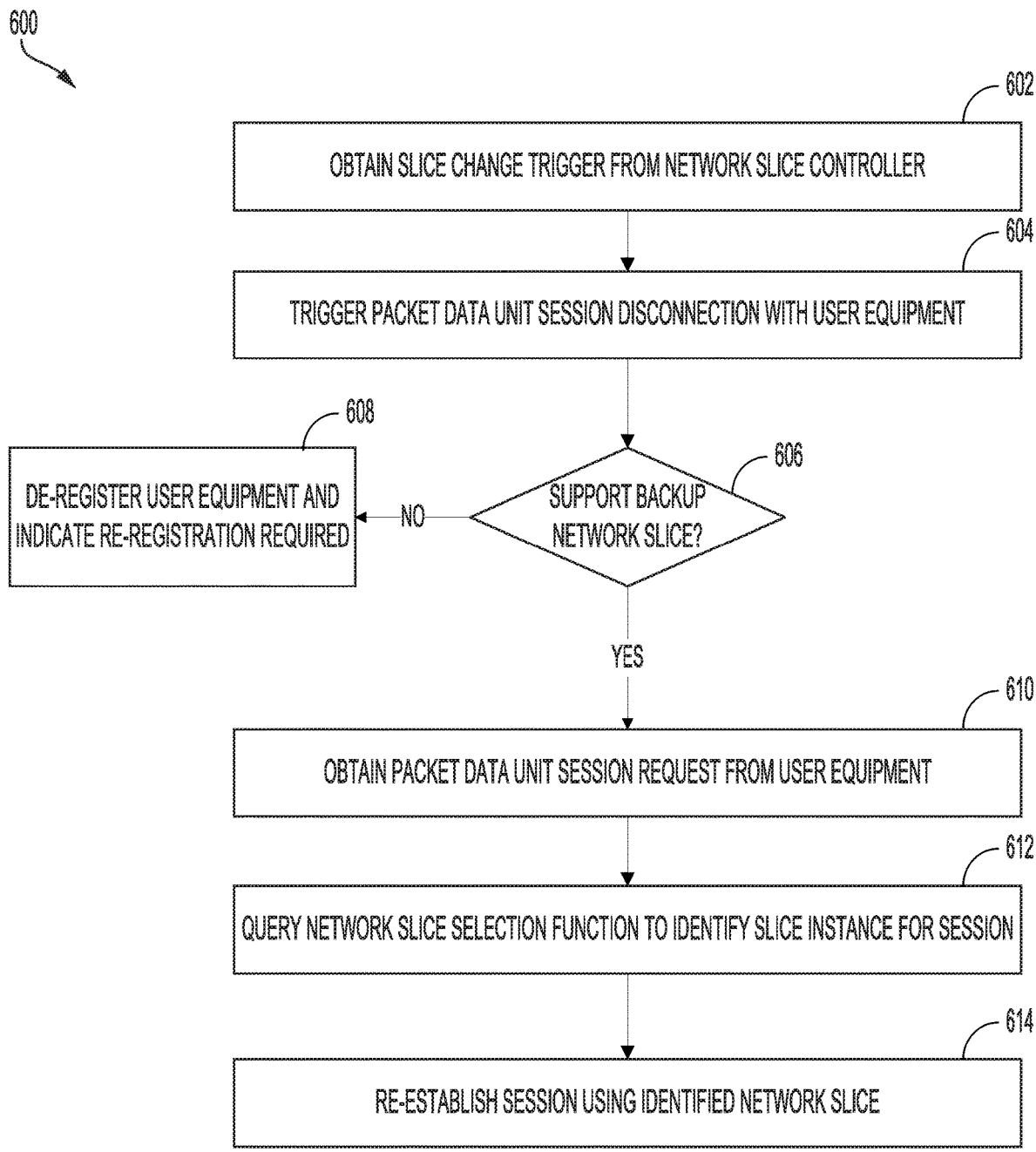
FIG. 6 shows an illustrative example of a process for triggering a packet data unit (PDU) session disconnection with a user equipment to cause the user equipment to request re-establishment of the PDU session with a new active network slice in accordance with some implementations.

FIG. 6 shows an illustrative example of a process 600 for triggering a packet data unit (PDU) session disconnection with a user equipment to cause the user equipment to request re-establishment of the PDU session with a new active network slice in accordance with some implementations. The process 600 may be performed by the Access and Mobility Management Function (AMF), which may receive all connection and session related information from various UE and may be responsible for handling connection and mobility management tasks. In one aspect, for a multi-vendor network slice configuration whereby an active network slice and a corresponding backup network slice (e.g., the 1:1 slice redundancy model), the AMF services both the active network slice and the corresponding backup network slice. Alternatively, in another aspect, the AMF is slice specific, such as in a multi-vendor network slice configuration with different slice identifiers (e.g., 1:N slice redundancy model).

In one aspect, the AMF obtains, at step 602, a slice change trigger from the network slice controller. The slice change trigger from the network slice controller may include the S-NSSAI of the backup network slice that is designated to become the new active network slice. In response to obtaining the slice change trigger, the AMF may configure the UE with the slice identifier indicated by the network slice controller via the S-NSSAI obtained by the AMF. For instance, the AMF may transmit, to the UE, the slice identifier corresponding to the backup network slice that is designated to become the new active network slice.

In addition to configuring the UE with the slice identifier indicated by the network slice controller, the AMF may, at step 604, trigger a packet data session (PDU) session disconnection with the user equipment. As noted above, the UE may be engaged with the active network slice via a User Plane Function (UPF) of the active network slice. The PDU session may be an IP type PDU session whereby the active network slice is used to transport IPv4 and/or IPv6 data packets from the UE to the UPF and vice versa. Alternatively, the PDU session may be an Ethernet type PDU session, whereby the active network slice provides the UE with Ethernet connectivity and transports Ethernet frames. The UE may disconnect from the PDU session in response to the notification or other indication from the AMF. In one aspect, the AMF indicates, to the UE, that the UE is to re-establish the PDU session while the restoration of the active network slice is performed.

In one aspect, the AMF determines, at step 606, whether the AMF supports the backup network slice. As noted above, in a 1:N slice redundancy model configuration, each network slice may have a unique AMF. Alternatively, the network slices may share a common AMF that is configured to handle connection and mobility management tasks for the various network slices in the network. If the AMF determines that it does not support the network slice corresponding to the network slice identifier provided by the network slice controller via the S-NSSAI of the backup network slice, the AMF may, at step 608, de-register the UE from the AMF and indicate, to the UE, that re-registration to an AMF is required. When the UE submits a new AMF registration request, the request may be received by the AMF which supports the backup network slice that is designated to become the new active network slice. In an alternative aspect, rather than de-registering the UE from the AMF, the AMF initiates an AMF relocation procedure to allocate the AMF to the backup network slice that is designated to be the new active network slice for the wireless communications network. This may allow the AMF to support the backup network slice as needed.

If the AMF supports the network slice corresponding to the network slice identifier provided by the network slice controller via the S-NSSAI of the network slice, the AMF may, at step 610, obtain a new request from the UE to establish a new PDU session with the network slice. The request may include the S-NSSAI of the backup network slice that is to serve as the new active network slice. In response to the PDU session request, the AMF may, at step 612, query the NSSF of the wireless communications network to identify the network slice instance for the PDU session. The AMF may query the NSSF with the S-NSSAI provided by the UE, which the NSSF may use to identify the network slice instance (e.g., network slice) that is to be used for the provided S-NSSAI. Once the AMF identifies the network slice instance to be used for the PDU session, the AMF may, at step 614 re-establish the PDU using the identified network slice instance.

FIG. 7 illustrates an example network device 700 suitable for performing switching, routing, and other networking operations in accordance with some implementations. Network device 700 includes a CPU 704, interfaces 702, and a connection 710 (e.g., a Peripheral Component Interconnect (PCI) bus). When acting under the control of appropriate software or firmware, the CPU 704 is responsible for executing packet management, error detection, and/or routing functions. The CPU 704 can accomplish these functions under the control of software including an operating system and any appropriate applications software. The CPU 704 may include one or more processors 708, such as a processor from the Intel® X98 family of microprocessors. In some cases, the processor 708 can be specially designed hardware for controlling the operations of network device 700. In some cases, a memory 706 (e.g., non-volatile RAM, ROM, etc.) also forms part of the CPU 704. However, there are many different ways in which memory could be coupled to the system.

The interfaces 702 are typically provided as modular interface cards (sometimes referred to as "line cards"). Generally, they control the sending and receiving of data packets over the network and sometimes support other peripherals used with the network device 700. Among the interfaces that may be provided are Ethernet interfaces, frame relay interfaces, cable interfaces, Digital Subscriber Line (DSL) interfaces, token ring interfaces, and the like. In addition, various very high-speed interfaces may be provided such as fast token ring interfaces, wireless interfaces, Ethernet interfaces, Gigabit Ethernet interfaces, Asynchronous Transfer Mode (ATM) interfaces, High-Speed Serial Interface (HSSI) interfaces, Packet Over SONET/SDH (POS) interfaces, Fiber Distributed Data Interface (FDDI) interfaces, WiFi interfaces, 3G/4G/5G cellular interfaces, Controller Area Network (CAN) bus, Long Range (LoRa), and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 704 to efficiently perform routing computations, network diagnostics, security functions, etc.

Although the system shown in FIG. 7 is one specific network device of the present technologies, it is by no means the only network device architecture on which the present technologies can be implemented. For example, an architecture having a single processor that handles communications as well as routing computations, etc., is often used. Further, other types of interfaces and media could also be used with the network device 700.

Regardless of the network device's configuration, it may employ one or more memories or memory modules (including memory 706) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 706 could also hold various software containers and virtualized execution environments and data.

The network device 700 can also include an application-specific integrated circuit (ASIC) 712, which can be configured to perform routing and/or switching operations. The ASIC 712 can communicate with other components in the network device 700 via the connection 710, to exchange data and signals and coordinate various types of operations by the network device 700, such as routing, switching, and/or data storage operations, for example.

FIG. 8 illustrates a computing system architecture 800 including various components in electrical communication with each other using a connection 806, such as a bus, in accordance with some implementations. Example system architecture 800 includes a processing unit (CPU or processor) 804 and a system connection 806 that couples various system components including the system memory 820, such as ROM 818 and RAM 816, to the processor 804. The system architecture 800 can include a cache 802 of high-speed memory connected directly with, in close proximity to, or integrated as part of the processor 804. The system architecture 800 can copy data from the memory 820 and/or the storage device 808 to the cache 802 for quick access by the processor 804. In this way, the cache can provide a performance boost that avoids processor 804 delays while waiting for data. These and other modules can control or be configured to control the processor 804 to perform various actions.

Other system memory 820 may be available for use as well. The memory 820 can include multiple different types of memory with different performance characteristics. The processor 804 can include any general purpose processor and a hardware or software service, such as service 1 810, service 2 812, and service 3 814 stored in storage device 808, configured to control the processor 804 as well as a special-purpose processor where software instructions are incorporated into the actual processor design. The processor 804 may be a completely self-contained computing system, containing multiple cores or processors, a bus, memory controller, cache, etc. A multi-core processor may be symmetric or asymmetric.

To enable user interaction with the computing system architecture 800, an input device 822 can represent any number of input mechanisms, such as a microphone for speech, a touch-sensitive screen for gesture or graphical input, keyboard, mouse, motion input, speech and so forth. An output device 824 can also be one or more of a number of output mechanisms known to those of skill in the art. In some instances, multimodal systems can enable a user to provide multiple types of input to communicate with the computing system architecture 800. The communications interface 826 can generally govern and manage the user input and system output. There is no restriction on operating on any particular hardware arrangement and therefore the basic features here may easily be substituted for improved hardware or firmware arrangements as they are developed.

Storage device 808 is a non-volatile memory and can be a hard disk or other types of computer readable media which can store data that are accessible by a computer, such as magnetic cassettes, flash memory cards, solid state memory devices, digital versatile disks, cartridges, RAMs 816, ROM 818, and hybrids thereof.

The storage device 808 can include services 810, 812, 814 for controlling the processor 804. Other hardware or software modules are contemplated. The storage device 808 can be connected to the system connection 806. In one aspect, a hardware module that performs a particular function can include the software component stored in a computer-readable medium in connection with the necessary hardware components, such as the processor 804, connection 806, output device 824, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

The invention claimed is:

1. A computer-implemented method comprising:
obtaining first health information of an active network slice provided by a first vendor and second health information of a set of backup network slices provided by a second vendor, wherein the first health information and the second health information correspond to events encountered by the active network slice and the set of backup network slices;
evaluating, using a set of policies corresponding to management of the active network slice, the first health information to identify an event corresponding to a failure of the active network slice, wherein the set of policies include a first subset of policies applicable to the active network slice and obtained from the first vendor and a second subset of policies applicable to the backup network slices and obtained from the second vendor;

as a result of the failure of the active network slice, identifying one or more backup network slices of the set of backup network slices to serve as new active network slices; and activating the one or more backup network slices to serve as the new active network slices.

2. The computer-implemented method of claim 1, further comprising:

determining, based on first configuration data of the active network slice, a configuration of the active network slice; and evaluating second configuration data of the set of backup network slices to identify the one or more backup network slices, the one or more backup network slices collectively having the configuration of the active network slice.

3. The computer-implemented method of claim 1, wherein activating the one or more backup network slices includes distributing an Internet Protocol address pool of the active network slice to the one or more backup network slices.

4. The computer-implemented method of claim 1, further comprising:

triggering a Packet Data Unit (PDU) session disconnection of a user equipment;

obtaining, from the user equipment, a request to establish a new PDU session;

querying a Network Slice Selection Function to identify a network slice instance identifier of a new active network slice of the new active network slices; and establishing the new PDU session using the new active network slice.

5. The computer-implemented method of claim 4, wherein establishing the new PDU session within the new active network slice includes migrating a PDU session of the active network slice to the new active network slice.

6. The computer-implemented method of claim 4, further comprising transmitting, to the user equipment, a notification to indicate that the new PDU session can be established.

7. A system, comprising:

one or more processors; and memory including instructions that, as a result of being executed by the one or more processors, cause the system to:

obtain first health information of an active network slice provided by a first vendor and second health information of a set of backup network slices provided by a second vendor, wherein the first health information and the second health information correspond to events encountered by the active network slice and the set of backup network slices;

evaluate, using a set of policies corresponding to management of the active network slice and to management of the set of backup network slices, the first health information to detect a failure of the active network slice, wherein the set of policies include a first subset of policies applicable to the active network slice and obtained from the first vendor and a second subset of policies applicable to the backup network slices and obtained from the second vendor;

as a result of the failure of the active network slice, identify, from the set of backup network slices and based on the second health information, one or more backup network slices to serve as new active network slices; and activate the one or more backup network slices to serve as the new active network slices.

8. The system of claim 7, wherein the instructions that cause the system to identify the one or more backup network slices further cause the system to:

determine a configuration of the active network slice; and select the one or more backup network slices as a result of the one or more backup network slices being capable of performing operations corresponding to the configuration of the active network slice.

9. The system of claim 7, wherein the instructions that cause the system to activate the one or more backup network slices to serve as the new active network slices further cause the system to distribute one or more Internet Protocol address pools of the active network slice to the one or more backup network slices.

10. The system of claim 7, wherein the instructions further cause the system to:

trigger a disconnection of a PDU session of a user equipment to the active network slice;

obtain, from the user equipment, a request to re-establish the PDU session;

query, in response to the request, a Network Slice Selection Function to identify a network slice instance identifier of a new active network slice of the new active network slices; and re-establish the PDU session using the new active network slice.

11. The system of claim 10, wherein the instructions that cause the system to re-establish the PDU session further cause the system to migrate the PDU session from the active network slice to the new active network slice.

12. The system of claim 10, wherein the instructions further cause the system to transmit a notification to the user equipment to indicate that the request to re-establish the PDU session can be submitted.

13. A non-transitory computer-readable storage medium storing thereon executable instructions that, as a result of being executed by one or more processors of a computer system, cause the computer system to:

obtain first health information of an active network slice provided by a first vendor and second health information of a set of backup network slices provided by a second vendor, wherein the first health information and the second health information correspond to events encountered by the active network slice and the set of backup network slices;

determine, based on the first health information and a set of policies corresponding to management of the active network slice and to management of the set of backup network slices, that the active network slice has failed, wherein the set of policies include a first subset of policies applicable to the active network slice and obtained from the first vendor and a second subset of policies applicable to the backup network slices and obtained from the second vendor;

identify, from the set of backup network slices and based on the second health information, at least one backup network slice of the set of network slices to serve as a new active network slice; and activate the at least one backup network slice to serve as the new active network slice.

14. The non-transitory computer-readable storage medium of claim 13, wherein the executable instructions further cause the computer system to:
- trigger a disconnection of a PDU session of a user equipment to the active network slice;
- obtain, from the user equipment, a request to re-establish the PDU session;
- query, in response to the request, a Network Slice Selection Function to identify a network slice instance identifier of the new active network slice; and
- re-establish the PDU session using the new active network slice.

15. The non-transitory computer-readable storage medium of claim 14, wherein the executable instructions that cause the computer system to re-establish the PDU session further cause the computer system to migrate the PDU session from the active network slice to the new active network slice.

16. The non-transitory computer-readable storage medium of claim 15, wherein the executable instructions that cause the computer system to re-establish the PDU session further cause the computer system preserve an Internet Protocol address of the PDU session after migration of the PDU session from the active network slice to the new active network slice.

17. The non-transitory computer-readable storage medium of claim 13, wherein the executable instructions further cause the computer system to distribute one or more Internet Protocol address pools of the active network slice to the at least one backup network slice.

18. The non-transitory computer-readable storage medium of claim 13, wherein the executable instructions that cause the computer system to identify the at least one backup network slice further cause the computer system to:
- determine a configuration of the active network slice; and
- select the at least one backup network slice as a result of a determination that the at least one backup network slice is capable of performing operations corresponding to the configuration of the active network slice.

19. The non-transitory computer-readable storage medium of claim 13, wherein the executable instructions further cause the computer system to provision a network slice instance for the at least one backup network slice.

20. The non-transitory computer-readable storage medium of claim 13, wherein the executable instructions further cause the computer system to transmit a notification to a user equipment engaged with the active network slice to cause the user equipment to engage the new active network slice.

* * * * *